(12) United States Patent
Squires et al.

(10) Patent No.: US 9,073,588 B1
(45) Date of Patent: Jul. 7, 2015

(54) HEAVY MACHINERY SUBSTRUCTURE FOR TRAVERSING AND WORKING OVER GROUND OBSTRUCTIONS

(71) Applicant: Orion Drilling Company, Corpus Christi, TX (US)

(72) Inventors: Wayne Squires, Corpus Christi, TX (US); Milan Rajic, Calgary (CA); Jovan Vracar, Calgary (CA); Philip Seely, Corpus Christi, TX (US); Ozzie Rios, Corpus Christi, TX (US); David Gibson, Corpus Christi, TX (US)

(73) Assignee: ORION DRILLING COMPANY, Corpus Christi, TX (US)

( * ) Notice: Subject to any disclaimer, the term of this patent is extended or adjusted under 35 U.S.C. 154(b) by 0 days.

(21) Appl. No.: 14/297,567

(22) Filed: Jun. 5, 2014

(51) Int. Cl.
*B62D 57/02* (2006.01)
*B62D 57/032* (2006.01)

(52) U.S. Cl.
CPC .............. *B62D 57/032* (2013.01); *B62D 57/02* (2013.01)

(58) Field of Classification Search
CPC ..... B62D 57/02; B62D 57/022; B62D 57/032
USPC ...................... 180/8.1, 8.2, 8.5, 8.6
See application file for complete search history.

(56) References Cited

U.S. PATENT DOCUMENTS

| | | | | |
|---|---|---|---|---|
| 2,541,496 | A | * | 2/1951 | Busick, Jr. et al. ............ 180/8.5 |
| 2,942,676 | A | * | 6/1960 | Kraus ............................ 180/8.5 |
| 3,527,313 | A | * | 9/1970 | Reimann ....................... 180/8.5 |
| 3,576,225 | A | * | 4/1971 | Chambers ...................... 180/8.5 |
| 3,612,201 | A | * | 10/1971 | Smith ............................ 180/8.6 |
| 3,689,029 | A | * | 9/1972 | Bargman, Jr. .................. 254/45 |
| 3,734,220 | A | | 5/1973 | Smith |
| 3,754,790 | A | | 8/1973 | Mappin |
| 3,804,137 | A | | 4/1974 | McColl |

(Continued)

FOREIGN PATENT DOCUMENTS

| | | |
|---|---|---|
| CN | 200520031523.9 Y | 8/2005 |
| CN | 200810123533.3 A | 6/2008 |

(Continued)

*Primary Examiner* — Joseph Rocca
*Assistant Examiner* — Maurice Williams
(74) *Attorney, Agent, or Firm* — Royston Rayzor Vickery & Williams L.L.P.; William P. Glenn, Jr.

(57) ABSTRACT

The present invention includes a load bearing mid-section weldment connected between a pair of telescoping incremental stepper assemblies to create a clearance space beneath the load bearing mid-section weldment and the telescoping incremental stepper assemblies thereby allowing the heavy machinery substructure to move and work over ground obstructions. Each telescoping incremental stepper assembly includes a bridge weldment connected between a pair of telescoping legs. Each telescoping leg includes at least one pair of nested leg sections and a linear actuator to adjust the length of the telescoping leg. Each telescoping leg further includes a fixed foot and an articulating pad assembly. The articulating pad assembly is configured to alternatively lift the foot and itself from the ground and moves the foot and itself relative to one another to move the heavy machinery substructure in incremental steps over the ground and any obstructions. The length of each telescoping leg is user adjustable and defines the height of the clearance space. The width of the load bearing mid-section defines the width of the clearance space. The length of the incremental stepper assembly defines the depth of the clearance space.

9 Claims, 14 Drawing Sheets

(56) References Cited

U.S. PATENT DOCUMENTS

| | | | |
|---|---|---|---|
| 3,807,519 A * | 4/1974 | Patch | 180/8.5 |
| 3,853,196 A | 12/1974 | Guest | |
| 3,900,077 A | 8/1975 | Gee et al. | |
| 3,911,980 A | 10/1975 | McColl | |
| 3,921,739 A | 11/1975 | Rich et al. | |
| 3,945,450 A | 3/1976 | Wilson et al. | |
| 4,014,266 A | 3/1977 | Naslund et al. | |
| 4,198,797 A | 4/1980 | Soble | |
| 4,241,803 A * | 12/1980 | Lauber | 180/8.1 |
| 4,863,184 A * | 9/1989 | Mena | 280/475 |
| 4,940,382 A * | 7/1990 | Castelain et al. | 414/749.1 |
| 5,351,626 A * | 10/1994 | Yanagisawa | 180/8.6 |
| 5,921,336 A | 7/1999 | Reed | |
| 6,581,525 B2 | 6/2003 | Smith | |
| 6,623,035 B1 * | 9/2003 | Schneider | 280/766.1 |
| 7,681,674 B1 | 3/2010 | Barnes et al. | |
| 7,806,207 B1 | 10/2010 | Barnes et al. | |
| 7,819,209 B1 | 10/2010 | Bezner | |
| 8,019,472 B2 * | 9/2011 | Montero SanJuan et al. | 700/245 |
| 8,051,930 B1 | 11/2011 | Barnes et al. | |
| 8,490,724 B2 | 7/2013 | Smith et al. | |
| 2010/0252395 A1 | 10/2010 | Lehtonen et al. | |
| 2013/0153309 A1 | 6/2013 | Smith et al. | |
| 2013/0156538 A1 | 6/2013 | Smith et al. | |
| 2013/0156539 A1 | 6/2013 | Smith et al. | |
| 2014/0054097 A1 * | 2/2014 | Bryant et al. | 180/8.1 |

FOREIGN PATENT DOCUMENTS

| | | | |
|---|---|---|---|
| CN | 201010142482.6 A | 4/2010 | |
| CN | 201120326068.0 U | 9/2011 | |
| FR | 2607093 A1 * | 5/1988 | B62D 57/024 |

* cited by examiner

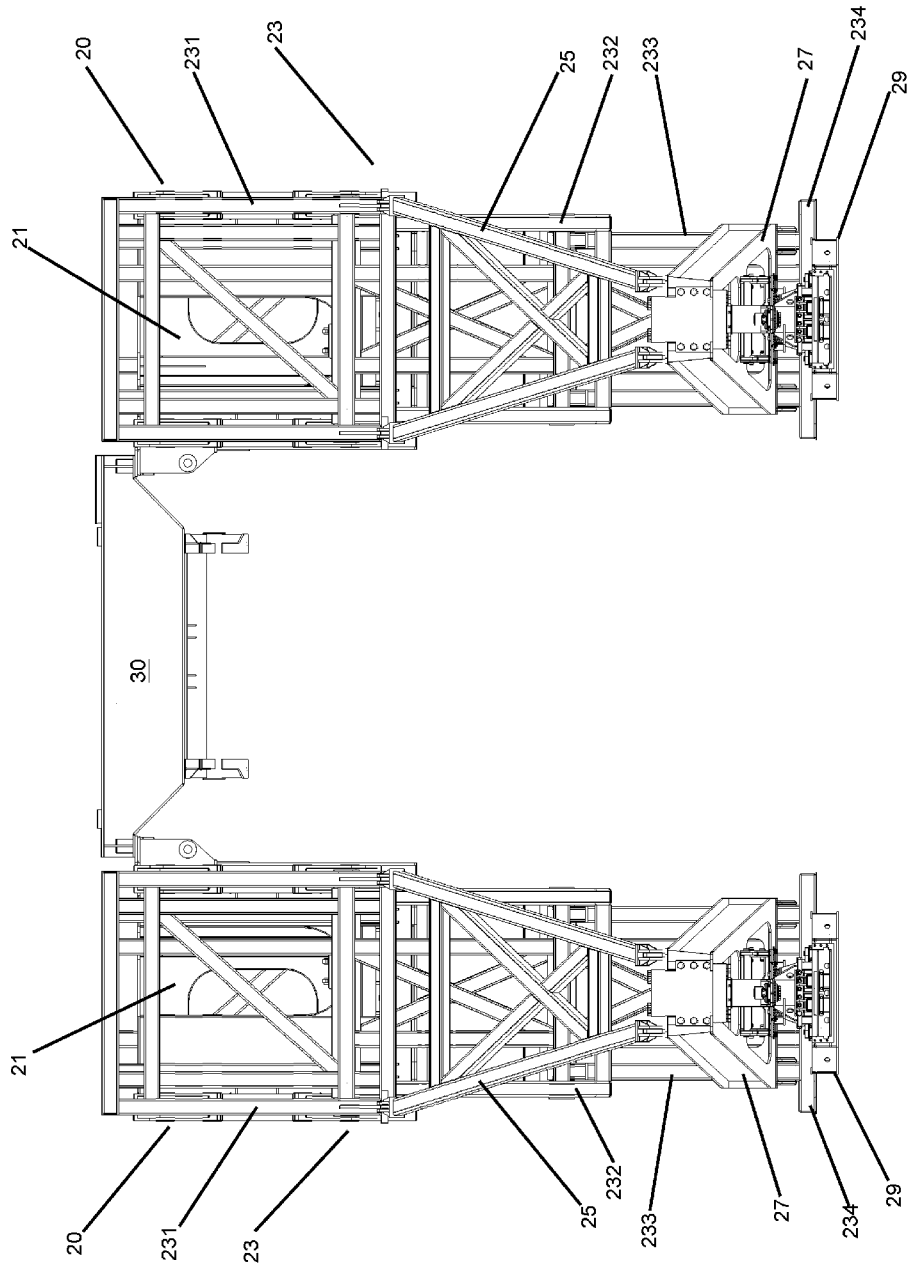

HEAVY MACHINERY SUBSTRUCTURE FOR TRAVERSING AND WORKING OVER GROUND OBSTRUCTIONS

CROSS-REFERENCES TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING

Not Applicable

BACKGROUND OF INVENTION

1. Field of Invention

The present invention relates generally to substructures capable of supporting heavy machinery, such as a rotary drilling rig, to traverse and work over ground obstructions. More particularly, the present invention relates to a substructure having at least a pair of ground engaging feet and a pair of telescoping legs and including a pair of articulating pad assemblies that alternatively lift the feet and the pads from the ground and move the feet and pads relative to one another to move the substructure over ground obstructions such as well heads.

2. Background of Invention

Heavy machinery has been supported by a variety of substructures capable of moving over the ground. An early example is the self-propelled platform vehicle disclosed in U.S. Pat. No. 3,754,790 issued to Mappin et al (Mappin '790). The vehicle is described as having two ground engaging sole plates carrying hydraulic rams for raising the vehicle from the ground to enable the vehicle to be advanced by a pair of advancing rams. The vehicle is incrementally walked over the ground by alternating ground contact of the sole plates. A significant disadvantage to the self-propelled vehicle of Mappin '790 is the lack of a means to walk over ground obstructions.

Another example of an alternating ground contact walker is disclosed in U.S. Pat. No. 3,734,220 issued to Smith (Smith '220). The deck or work platform of Smith '220 includes eight legs and a horizontal sliding frame wherein four legs are fixed at the corners of the deck platform and the other four legs are fixed to the corners of the horizontal sliding frame. The deck platform moves over the ground by alternating ground contact of the two sets of legs. While the legs are extensible, it is achieved through a screw jack mechanism capable of biding and failure if not properly maintained. Other disadvantages to the self-propelled platform of Smith '220 are the number of legs in alternating contact with the ground; the use of a horizontal sliding frame at the upper end of the legs; and the lack of a means to breakdown, transport and reassemble the self-propelled platform at desired locations.

The walking tree harvesting machine of U.S. Pat. No. 3,804,137 issued to McColl (McColl '137) addresses the lack of breakdown, transportability and reassembly of the incremental walking substructure of Smith '220. However, the McColl '137 walking tree harvesting machine requires the use of a horizontal sliding frame similar to that of Smith '220 and further lacks the ability to sustain prolonged elevated movement and operations. The incremental walking substructure disclosed in U.S. Pat. No. 5,921,336 issued to Reed (Reed '336) overcomes the disadvantages of the horizontal sliding frame of Smith '220 and McColl '137 by alternating ground contact between the substructure and a plurality of jack pads wherein each jack pad includes an upper section which is in roller contact with a rail attached to a lower section, thereby eliminating the need for a horizontal sliding frame. However, the walking substructure device described in Reed '336 has no means to sustain prolonged elevated movement and operations of the substructure above ground obstructions.

BRIEF SUMMARY OF THE INVENTION

The present invention is directed at a heavy machinery substructure capable of traversing and working over obstructions projecting away from the ground. In its most basic embodiment, the present invention includes a load bearing mid-section weldment connected between a pair of telescoping incremental stepper assemblies to create a clearance space beneath the load bearing mid-section weldment and the telescoping incremental stepper assemblies thereby allowing the heavy machinery substructure to move and work over ground obstructions. Each telescoping incremental stepper assembly includes a bridge weldment connected between a pair of telescoping legs. Each telescoping leg includes at least one pair of nested leg sections and a linear actuator to adjust the length of the telescoping leg. Each telescoping leg further includes a fixed foot and an articulating pad assembly. The articulating pad assembly is configured to alternatively lift the foot and itself from the ground and moves the foot and itself relative to one another to move the heavy machinery substructure in incremental steps over the ground and any obstructions. The length of each telescoping leg is user adjustable and defines the height of the clearance space. The width of the load bearing mid-section defines the width of the clearance space. The length of the incremental stepper assembly defines the depth of the clearance space.

BRIEF DESCRIPTION OF THE SEVERAL VIEWS OF THE DRAWINGS

FIG. 2 further depicts the bridge weldments connected to the telescoping legs, which are in an extended position. One embodiment of the articulating pad assemblies is depicted in FIG. 2 wherein the braces and main frame weldments are parallel to a longitudinal axis of the mid-section weldment.

FIG. 3 is an end view of an heavy machinery substructure depicting bridge weldments, mid-section weldment and telescoping legs in an extended position. FIG. 3 further depicts the articulating pad assemblies in ground contact and the telescoping legs off the ground.

FIG. 3a further depicts the articulating pad assemblies within the telescoping legs.

FIG. 5a further depicts the locking pins of the upper and lower pinning assemblies engaged and passing through upper, middle and lower locking apertures formed in the top, middle and bottom leg sections.

FIG. 5b further depicts the locking pins of the upper and lower pinning assemblies engaged and passing through upper, middle and lower locking apertures formed in the top, middle and bottom leg sections.

DETAILED DESCRIPTION OF THE PREFERRED EMBODIMENTS

Figure 1:
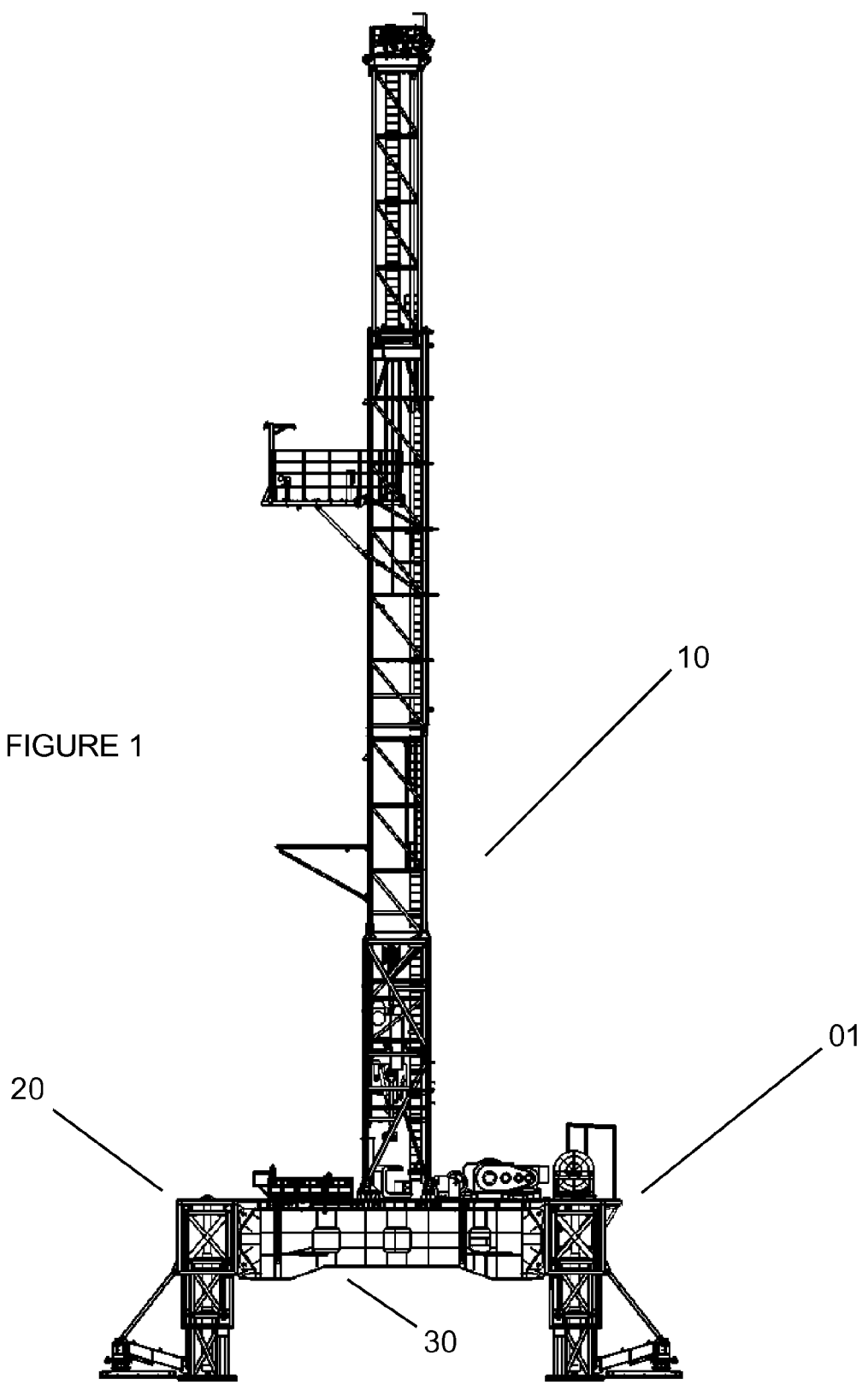
FIG. 1 is a isometric view of an heavy machinery substructure with a drilling package.

The present invention is a heavy machinery substructure 10 to traverse and position heavy machinery 10 over ground obstructions. The heavy machinery 10 can be a drilling rig as shown in FIG. 1, work over rig or other heavy machinery requiring stable, yet moveable substructure. The heavy machinery substructure 10 includes a mid-section weldment 30 connected between a pair of incremental stepper assemblies 20. The mid-section weldment 30 and incremental stepper assemblies 20 are constructed of durable materials with sufficient strength to support the installed heavy machinery 10 while being moved or working over ground obstructions. The connections between a mid-section weldment 30 and incremental stepper assemblies 20 can be permanent or, preferably, removable.

Figure 2:
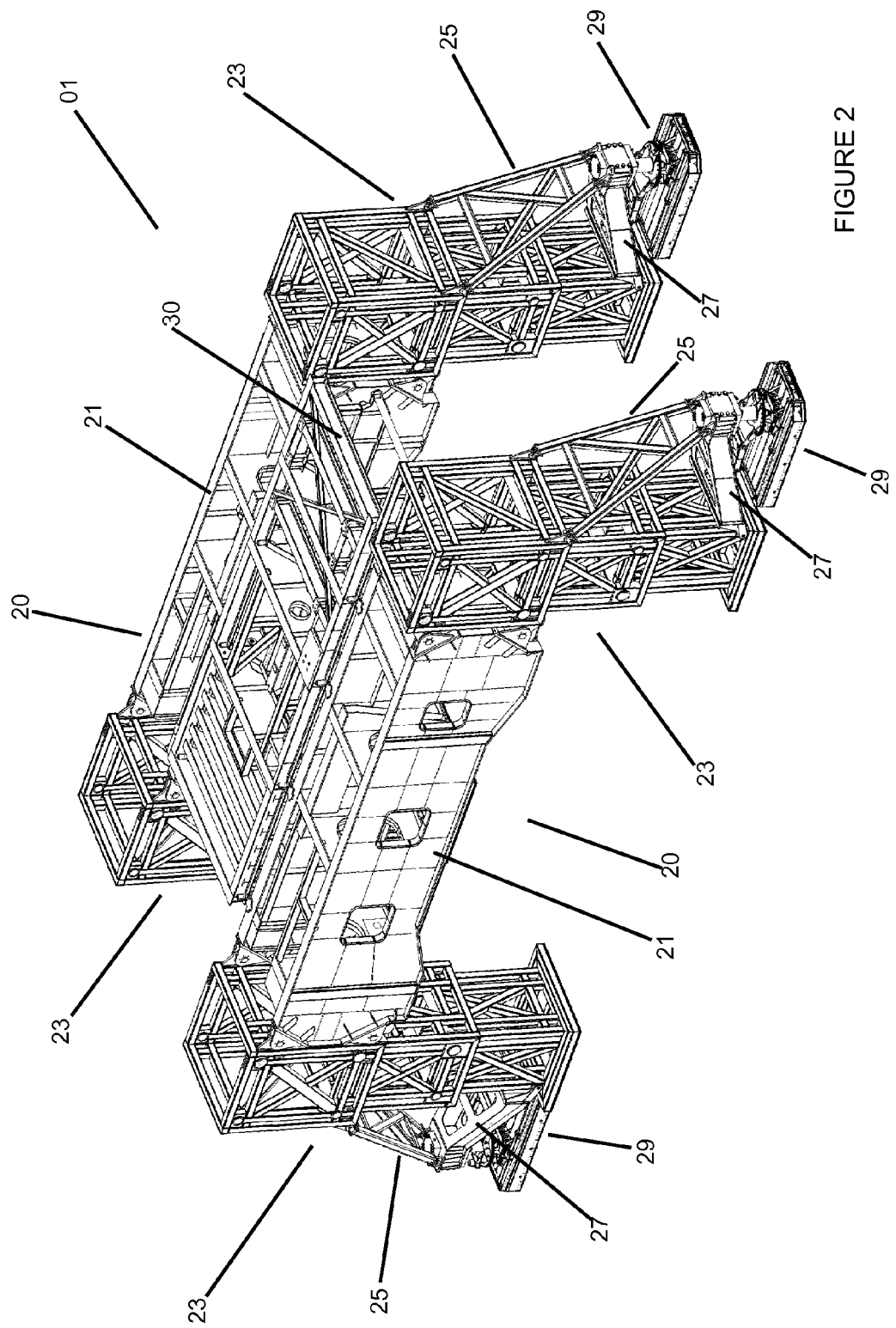
FIG. 2 is an isometric view of an heavy machinery substructure depicting incremental stepper assemblies connected to the mid-section weldment.

Each incremental stepper assembly 20 includes a bridge weldment 21 connected to two telescoping legs 23. In a preferred embodiment, as shown in FIG. 2, the telescoping legs 23 are connected to the ends of the bridge weldment 21, such that the telescoping legs 23 and the bridge weldment 21 are in line with each other. It is contemplated that the connections between a bridge weldment 21 and a telescoping leg 23 can be permanent or, preferably, removable.

Figure 5:
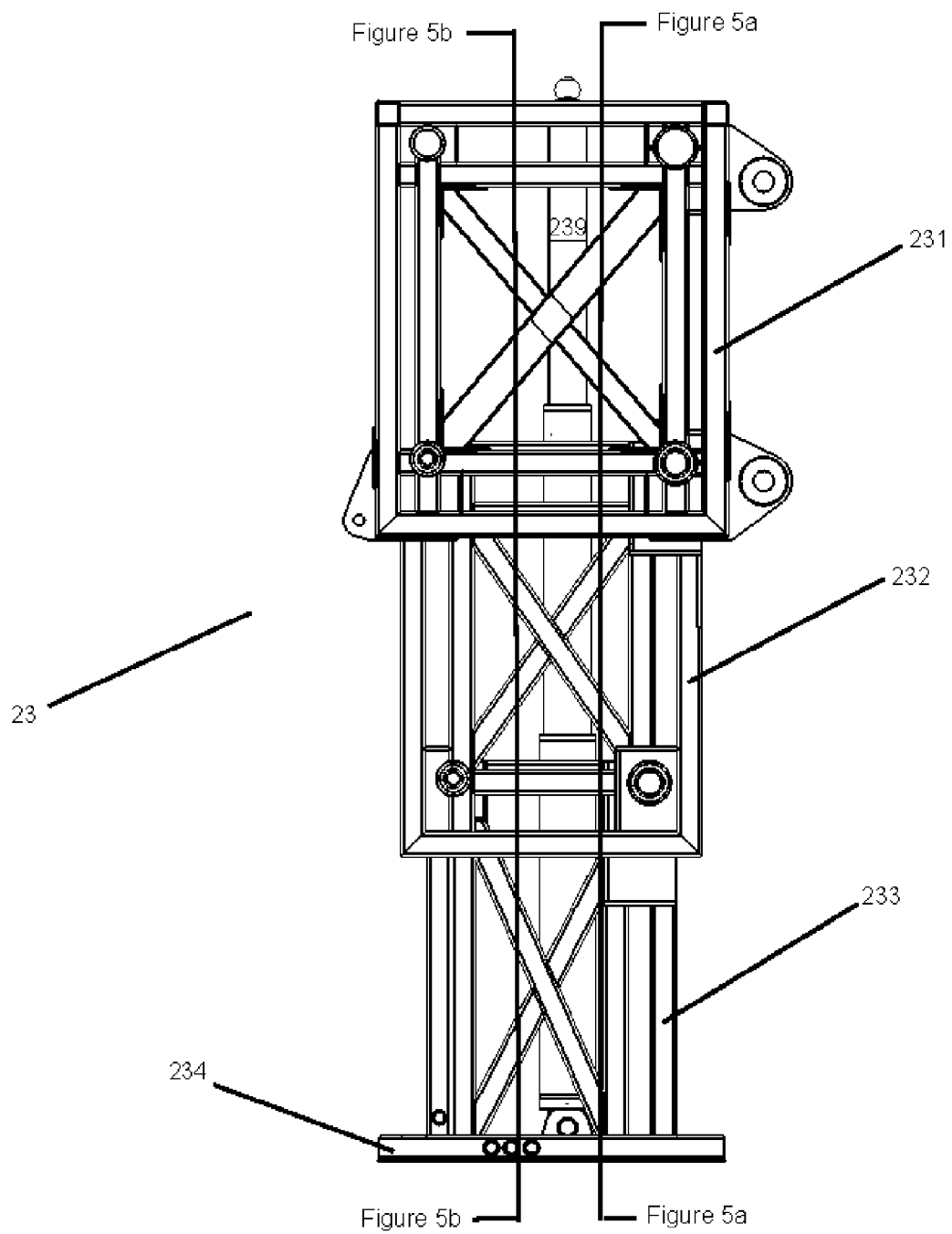
FIG. 5 is a plan view of an extended telescoping leg depicting top, middle and bottom leg sections, and linear actuator.

Each telescoping leg 23 includes at least one telescopic joint 24. In a preferred embodiment, as shown in FIG. 2, each telescoping leg 23 has two telescopic joints 24 formed by nesting an upper portion of a bottom leg section 233 within a lower portion of a middle leg section 232, and nesting an upper portion of the middle leg section 232 in the lower portion of a top leg section 231, thereby giving the telescopic leg 23 a downward tiering form. In another embodiment, each telescopic leg 23 has at least one telescopic joint 24 formed by nesting a lower portion of a leg section within an upper portion of a lower leg section, thereby giving the telescopic leg 23 an upward tiering form. Each section of a telescopic leg 23 can include a solid wall, open frame or combination thereof. FIG. 5 depicts an open frame telescopic leg 23. Furthermore, the cross section of a telescopic leg 23 can be polygonal, circular, arcuate or a combination thereof.

Extension or retraction of a telescopic leg 23 is achieved by connecting at least one linear actuator 239 between two leg sections, adjacent or otherwise. One end of the linear actuator 239 is fixed to the bottom leg section 233 and the other end of the linear actuator 239 is fixed to the top leg section 231. In other words, extension or retraction of a telescopic leg 23, partial or otherwise, requires at least one linear actuator 239 to be fixed to different sections of a telescopic leg 23 and across at least one telescopic joint 24. In a preferred embodiment, a linear actuator 239 is connected between a top leg section 231 and a bottom leg section 233 thereby allowing full or partial extension or retraction of a telescopic leg 23. See FIG. 5. It is further contemplated that a linear actuator 239 can be an electro-mechanical linear actuator, a hydraulic linear actuator, pneumatic linear actuator, telescoping linear actuator or any combination thereof. In a preferred embodiment, a telescoping linear actuator is used to extend or retract a telescopic leg 23. It is further contemplated that the linear actuator 239 may be positioned inside or outside the telescopic leg 23. FIG. 5 depicts the linear actuator 239 positioned inside the telescopic leg 23.

Figure 3A:
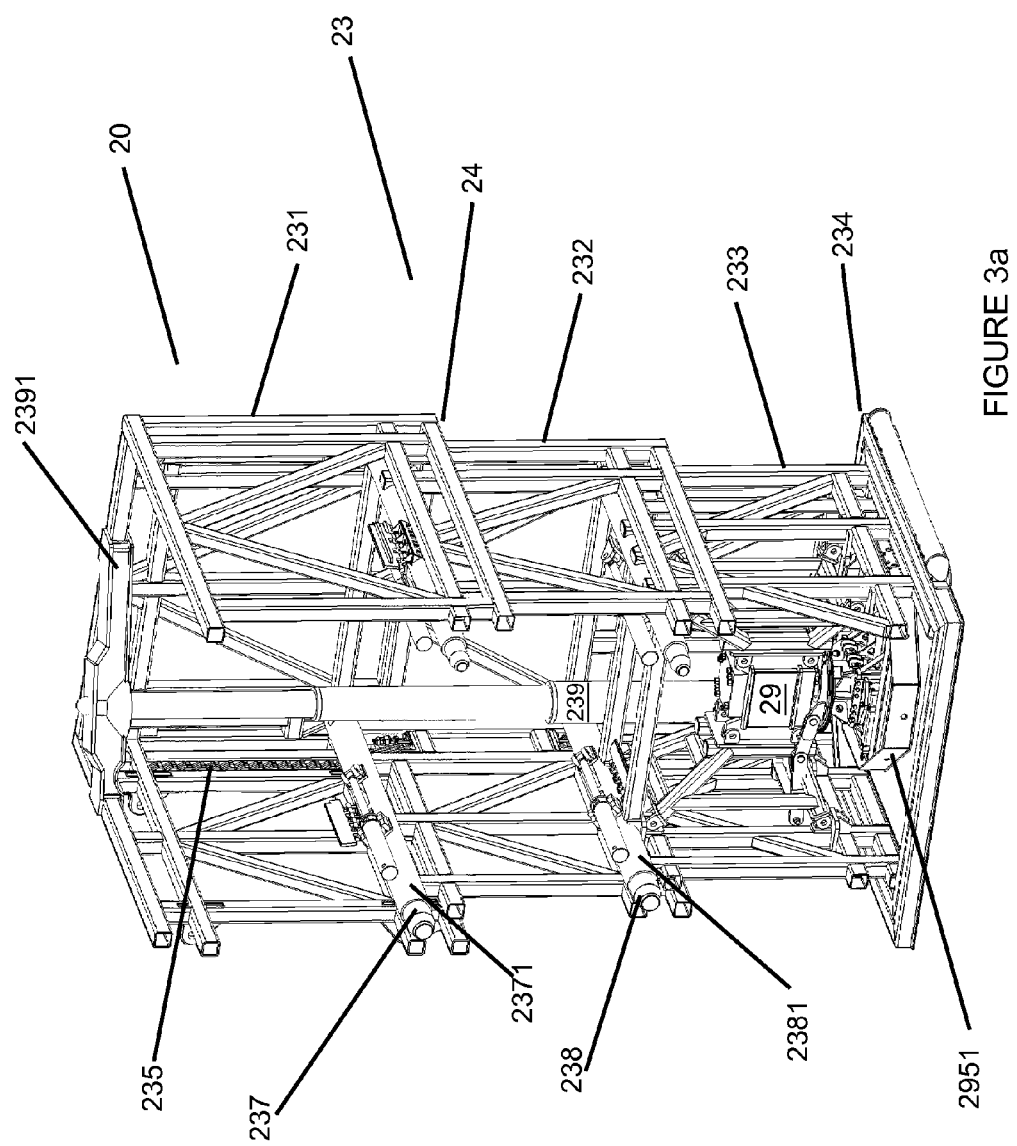
FIG. 3a is an end view of an alternative embodiment of the heavy machinery substructure depicting bridge weldments, mid-section weldment and telescoping legs in an extended position.
Figure 4:
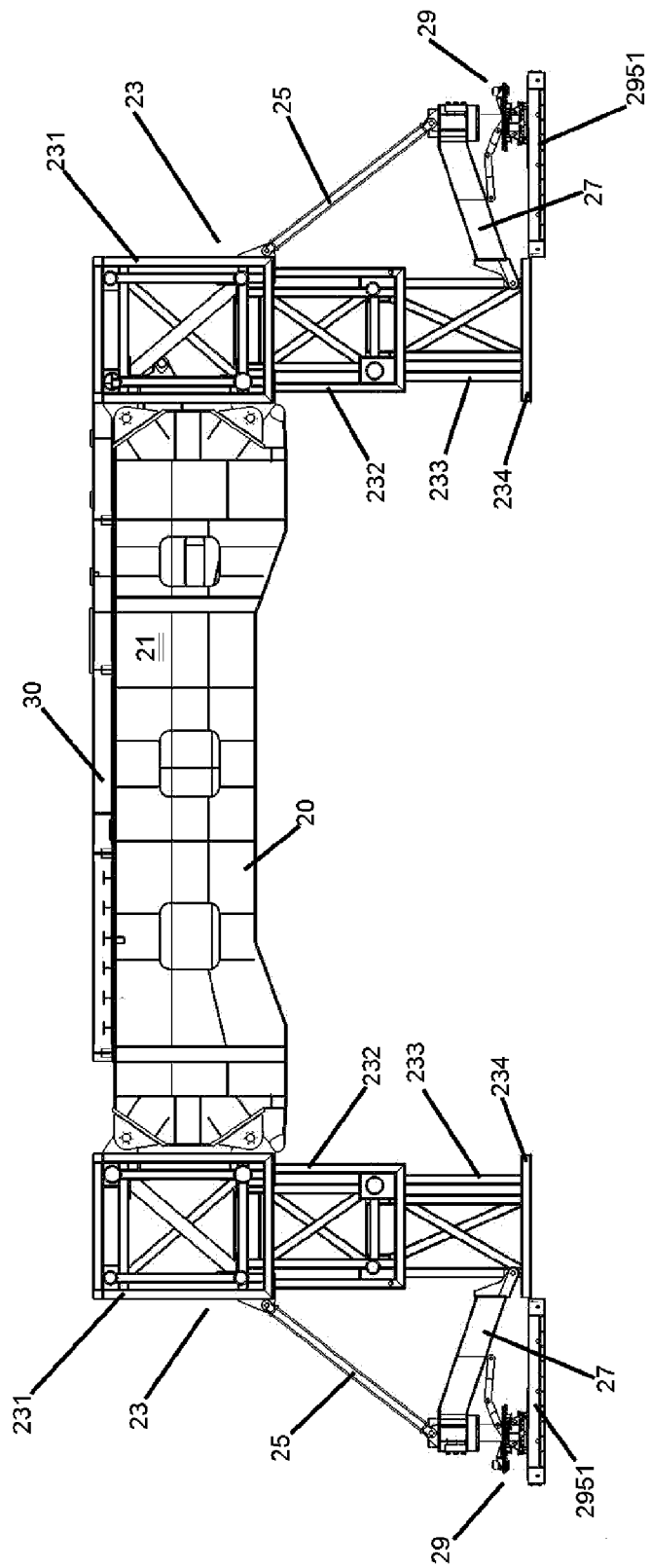
FIG. 4 is an plan view of an heavy machinery substructure depicting an incremental stepper assembly with the telescoping legs extended and the articulating pad assemblies in ground contact.

A foot 234 is fixed to the lower region of a telescoping leg 23 for making contact with the ground. At least one articulating pad assembly 29 is connected to a telescoping leg 23 by a main frame weldment 27. In a preferred embodiment, linear actuator 239 is fixed at one end to a shoulder 2391 which is in turn fixed to an upper portion of top leg section 231; and the other end is fixed to foot 234. See FIG. 3a. In a preferred embodiment, a main frame weldment 27 is connected to a lower portion of a telescopic leg. See FIGS. 2, 3, 4 & 7. In a preferred embodiment, a brace 25 is connected to a telescopic leg 23 above the main frame weldment 27. See FIGS. 2, 3, 4 & 7. In another embodiment, an articulating pad assembly 29 is positioned within a telescopic leg 23 and foot 234 is about the periphery of articulating pad assembly 29. See FIG. 3a. In such an embodiment, brace 25 is integrated into telescopic leg 23 to support articulating pad assembly 29. In either embodiment, connections between an articulating pad assembly 29, main frame weldment 27, brace 25 and telescopic leg 23 can be permanent or, preferably, removable.

Figure 8:
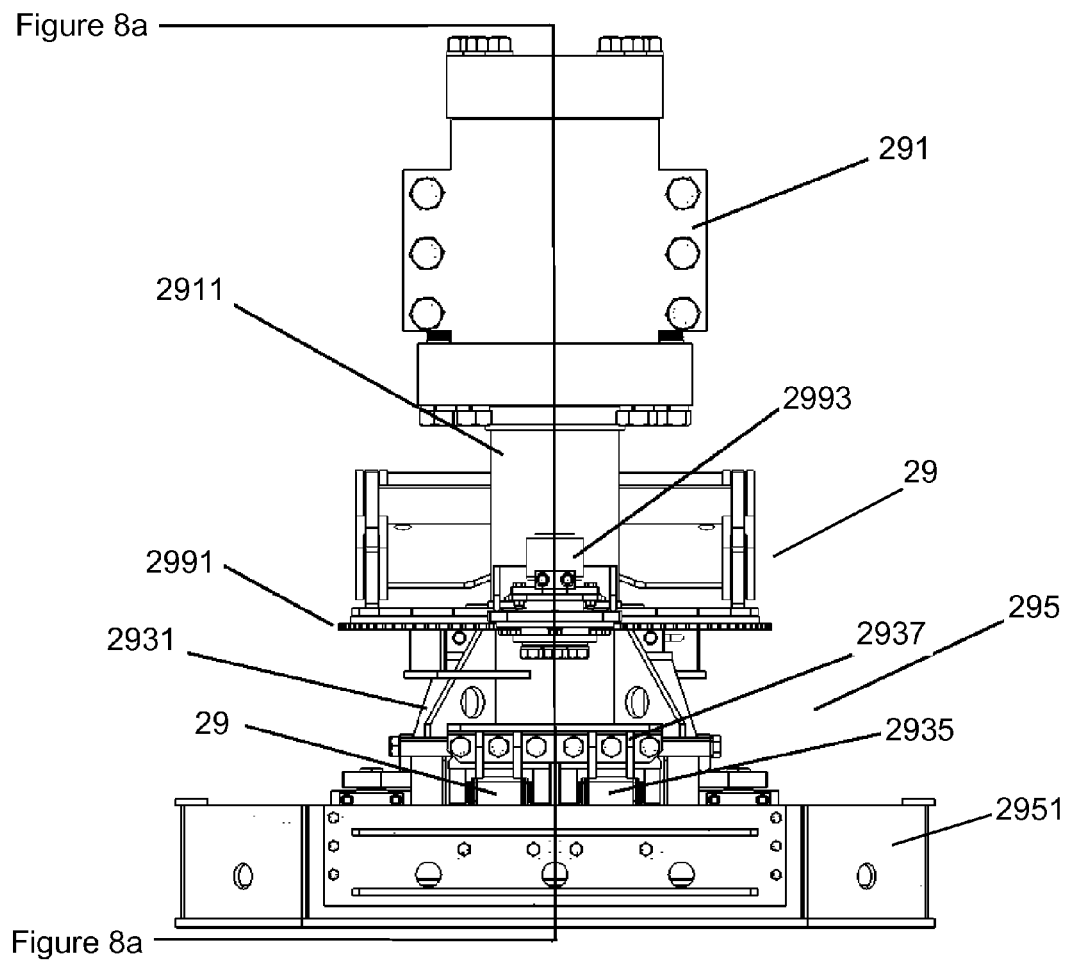
FIG. 8 is an end view of an articulating pad assembly depicting main frame assembly, pad assembly, indexer assembly and steering assembly.

Each articulating pad assembly 29 includes a lifting linear actuator 2911 connected between a main frame assembly 291 and a roller assembly 293. See FIG. 7. The main frame assembly 291 is connected to the main frame weldment 27. The lower end of the lifting linear actuator 2911 is slideably connected to a pad 2931. The upper portion of the pad 2931 is configured with at least one track 2953 and the underneath portion of the pad 2931 is configured to make contact with the ground. In a preferred embodiment, the pad 2951 has two tracks 2953 with a "T" shaped cross section thereby creating a slot 2955 between them. See FIG. 8. The lower end of the lifting linear actuator 2911 is connected to a cylinder cage weldment 2931. See FIG. 8. A roller locker 2937 is formed in the lower part of the cylinder cage weldment 2931. See FIG. 8. The roller locker 2937 is configured to house at least one set of Hillman rollers 2935. In a preferred embodiment, the roller locker 2937 is configured to hold two sets of Hillman rollers 2935. See FIG. 8. In either embodiment, the Hillman rollers 2935 are in rolling contact with at least one track 2953. In a preferred embodiment, a guide 2939 is configured to slide in the slot 2955 to keep the Hillman rollers 2935 on the track. Similarly, guides 2939 are configured to hook under the outside portions of the track 2953 to keep the Hillman rollers 2935 in rolling contact with the track 2953 when the pad assembly 295 is lifted off the ground by the lifting linear actuator 2911. A traversing linear actuator 2957 is connected at one end to pad 2951 and the other end connected to cylinder cage weldment 2931. Both the lifting linear actuator 2911 and the traversing linear actuator 2957 can be an electro-mechanical linear actuator, hydraulic linear actuator, pneumatic linear actuator, telescoping linear actuator or any combination thereof.

Figure 6:
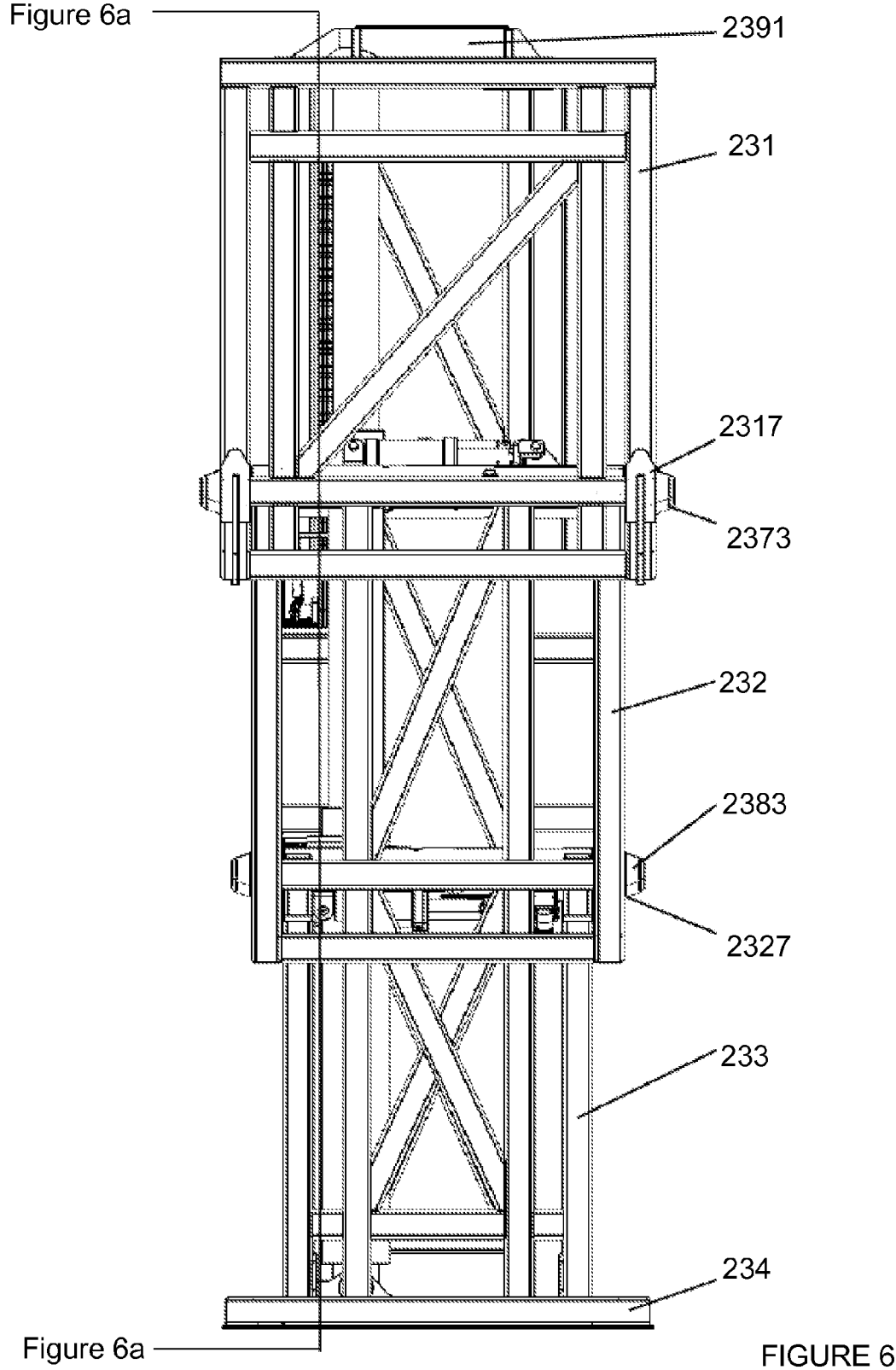
FIG. 6 is another plan view of an extended telescoping leg depicting top, middle and bottom leg sections, and linear actuator.
Figure 6A:
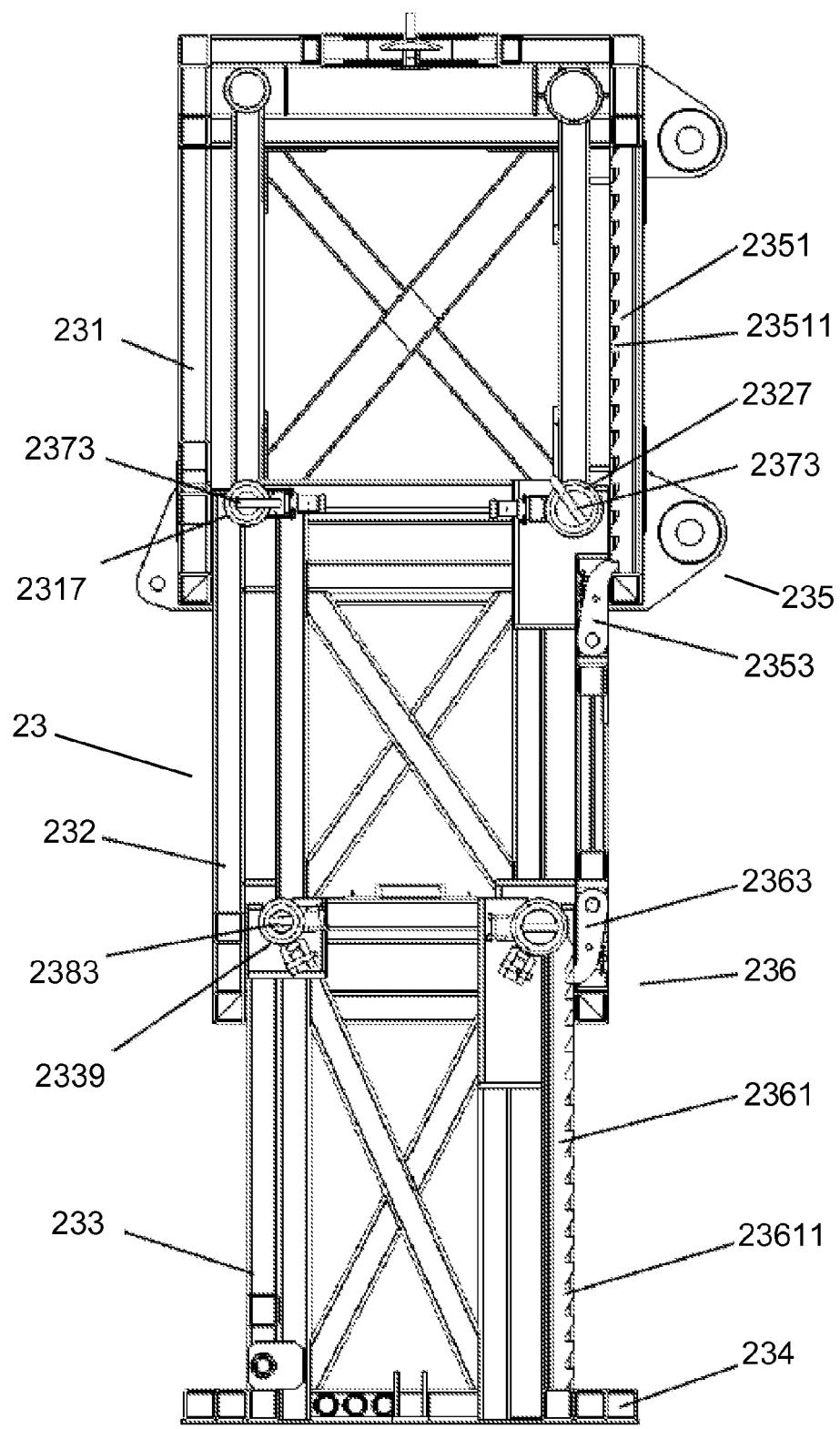
FIG. 6a is a cross section of an extended telescoping leg assembly depicting top, middle and bottom leg sections, upper ratchet system, and lower ratchet system.
Figure 7:
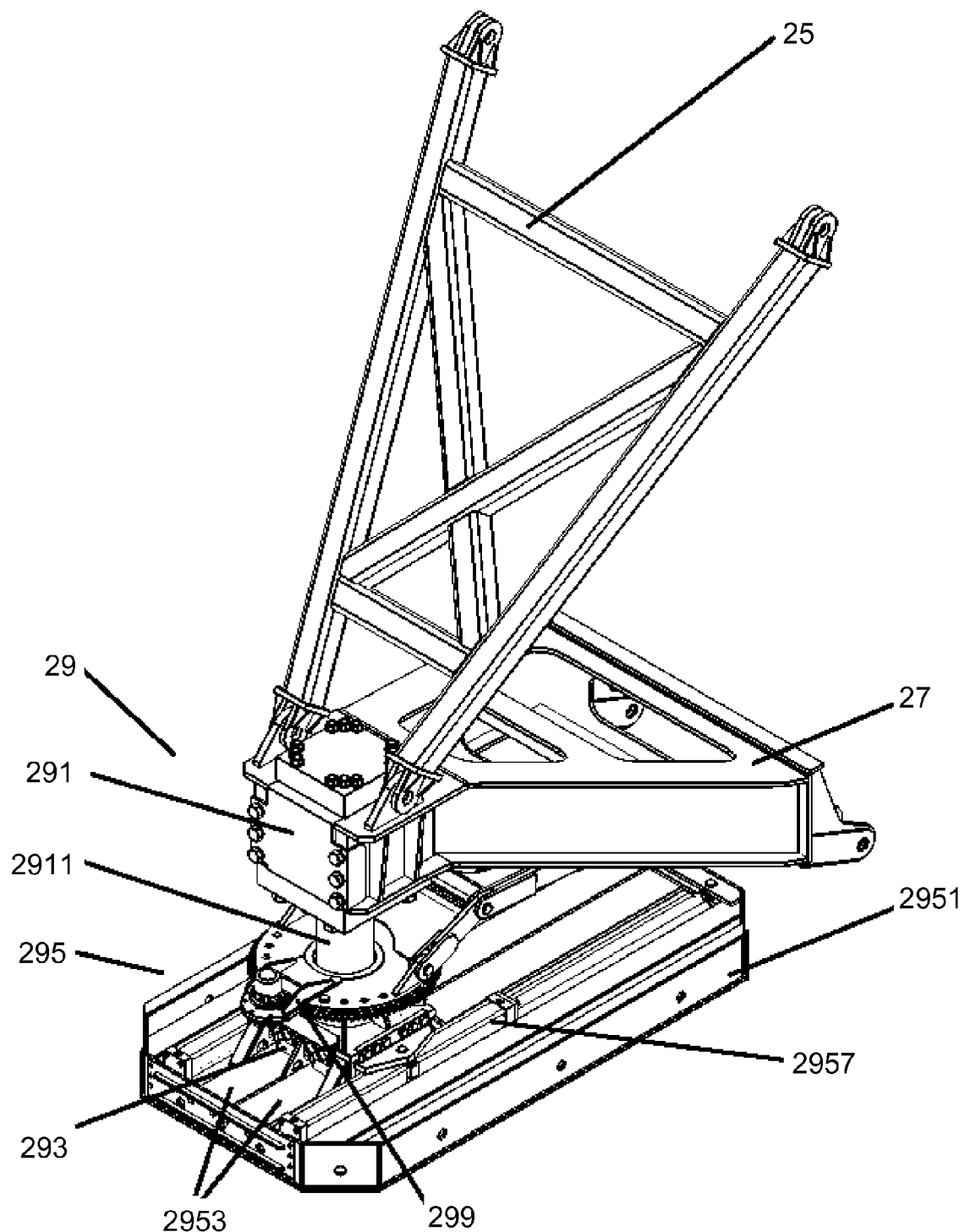
FIG. 7 is an isometric view of an articulating pad assembly depicting brace, main frame weldment, main frame assembly, pad assembly, indexer assembly and steering assembly.

In a preferred embodiment, each telescoping leg 23 included a ratchet system 235, 236 to prevent the telescoping leg 23 from collapsing upon itself in the event of linear actuator 239 failure. As depicted in FIG. 6a, an upper ratchet system 235 is connected between a top leg section 231 and a middle leg section 232. The upper ratchet system includes an upper linear rack 2351 connected to the top leg section 231. A plurality of asymmetrical teeth 23511 project away from the upper linear rack 2351. See FIG. 6a. An upper pawl 2353 is connected to the middle leg section 232 and it is configured to selectively engage the plurality of asymmetrical teeth 23511 of the upper linear rack 2351 to prevent movement of the top leg section towards the middle leg section 232. A similar ratchet system is installed on the lower portion of a telescopic leg 23 to prevent the telescoping leg 23 from collapsing upon itself in the event of linear actuator 239 failure. As depicted in FIG. 6a, a lower ratchet system 236 is connected between a middle leg section 232 and a bottom leg section 233. The lower ratchet system 236 includes an lower linear rack 2361 connected to the bottom leg section 233. A plurality of asymmetrical teeth 23611 project away from the lower linear rack 2361. See FIG. 6a. A lower pawl 2363 is connected to the bottom leg section 233 and it is configured to selectively engage the plurality of asymmetrical teeth 23611 of the lower linear rack 2361 to prevent movement of the middle leg section 232 towards the bottom middle leg section 233.

Figure 5A:
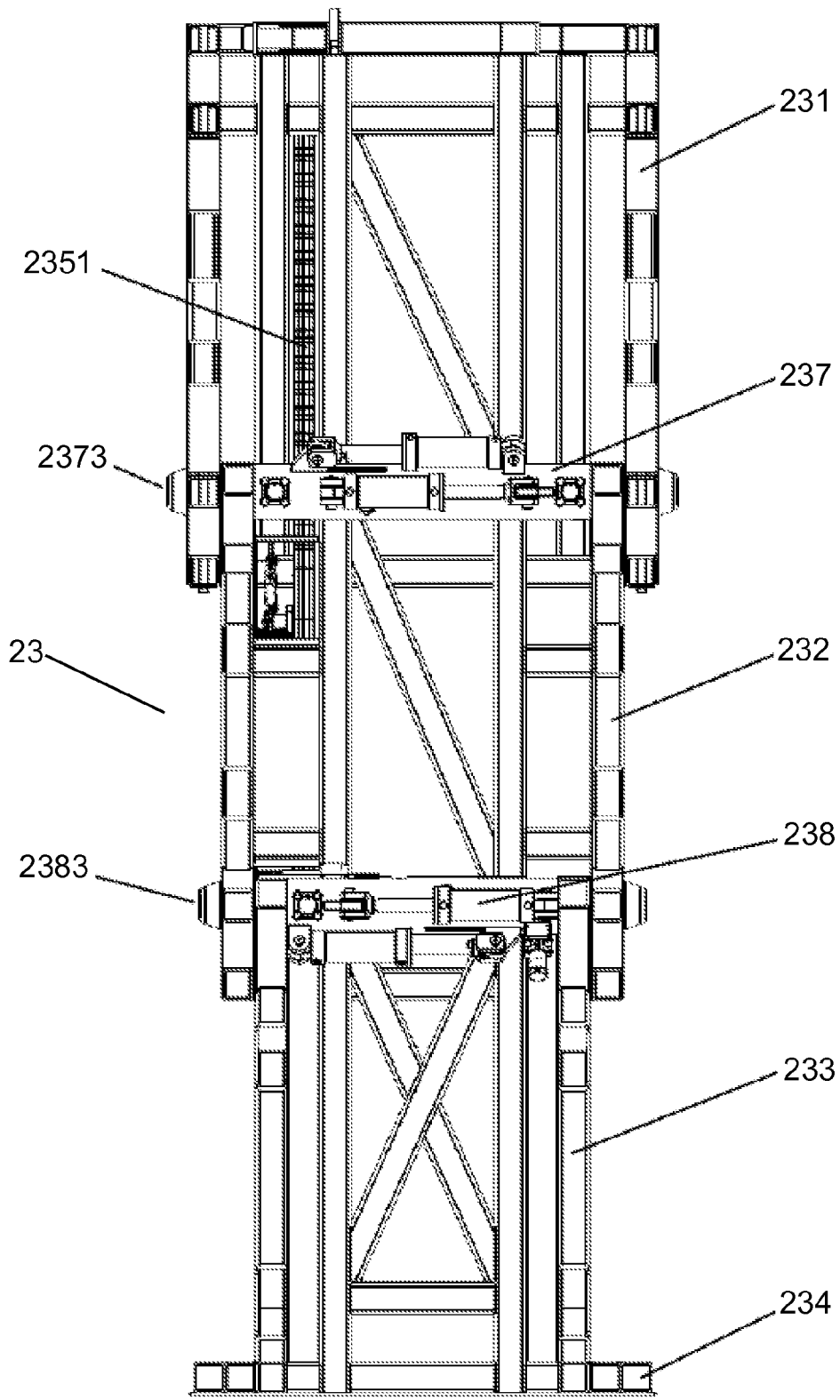
FIG. 5a is a cross section of an extended telescopic leg depicting top, middle and bottom leg sections, upper pinning assembly, and lower pinning assembly.
Figure 5B:
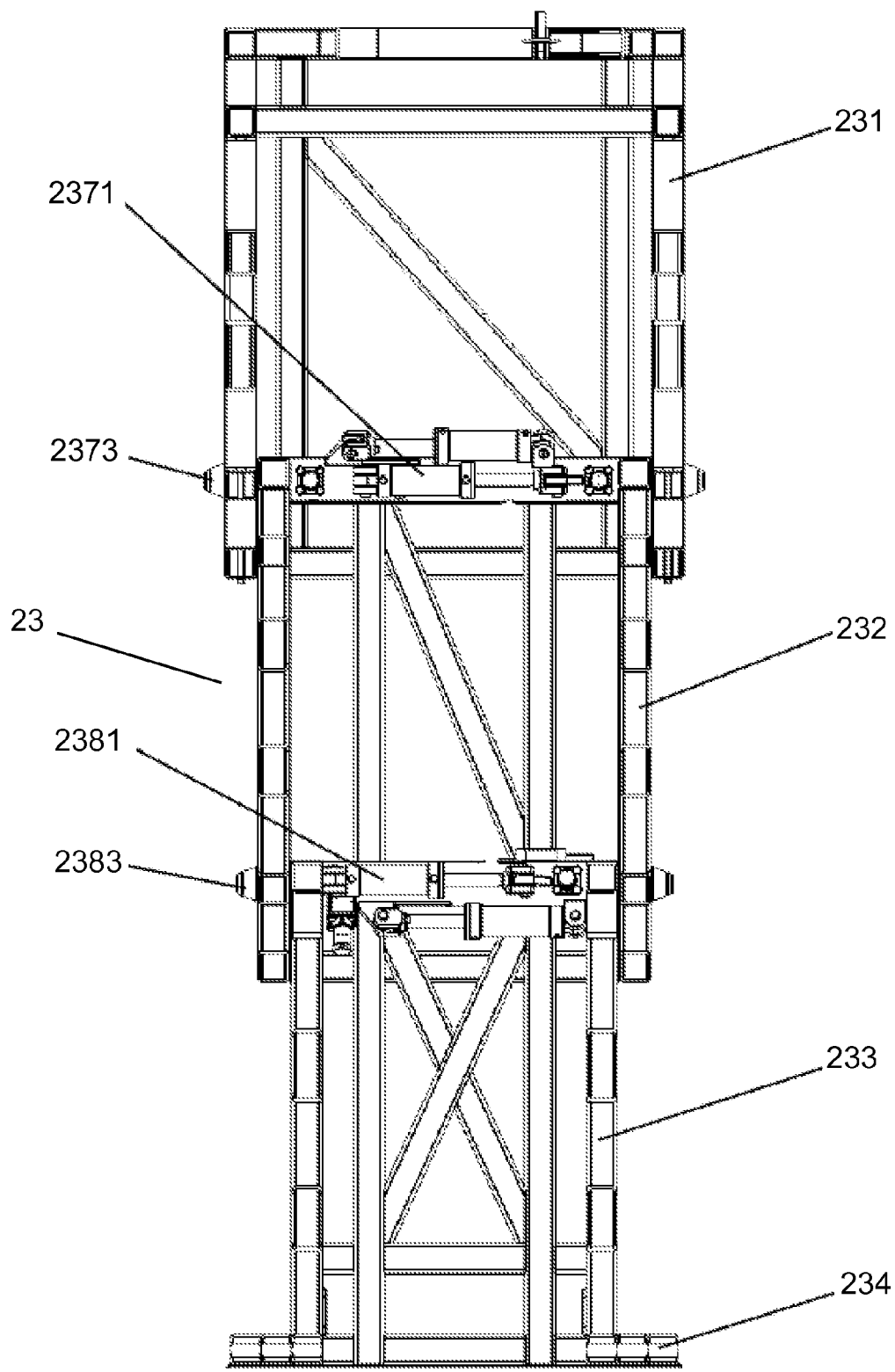
FIG. 5b is another cross section of an extended telescopic leg depicting top, middle and bottom leg sections, upper pinning assembly, and lower pinning assembly.

In another preferred embodiment of the heavy equipment substructure 01, a pinning assembly 237, 238 is connected to the telescoping leg 23 and configured to fix the length of the telescoping leg 23 to a pre-determined length. In its most basic form, an upper locking aperture 2317 is formed in the top leg section 231 of each telescopic leg; two middle locking apertures 2327 are formed in the middle leg section 232; and a lower locking aperture 2339 is formed in the bottom leg section 233. The first middle locking aperture 2327 is located above the second middle locking aperture 2327. See FIGS. 5, 5a, and 5b. An upper pinning assembly 237 is mounted on the upper portion of the middle leg section 232. A lower pinning assembly 238 is mounted on the upper portion of the bottom leg section 233. See FIG. 5a. The upper pinning assembly 237 comprises a locking pin 2373 of sufficient length to pass through the upper locking aperture 2317 and the first middle locking aperture 2327 when the upper locking aperture 2317 and the first middle locking aperture are aligned. An upper linear actuator 2371 mounted to the middle leg section 232 and connected to one end of the upper locking pin 2373, the upper linear actuator 2371 configured to stroke the upper locking pin 2373 in or out of the aligned upper locking aperture 2317 and the first middle locking aperture 2327. The lower pinning assembly 238 comprises a locking pin 2383 of sufficient length to pass through the lower locking aperture 2339 and the second middle locking aperture 2327 when the lower locking aperture 2339 and the second middle locking aperture 2327 are aligned. A lower linear actuator 2381 mounted to the bottom leg section 233 and connected to one end of the lower locking pin 2383, the lower linear actuator 2381 configured to stroke the lower locking pin 2383 in or out of the aligned lower locking aperture 2339 and the second middle locking aperture 2327. In a preferred embodiment, each telescopic leg 23 would have four upper pinning assemblies 237 and four lower pinning assemblies 238. See FIGS. 5, 5a and 5b.

Figure 8A:
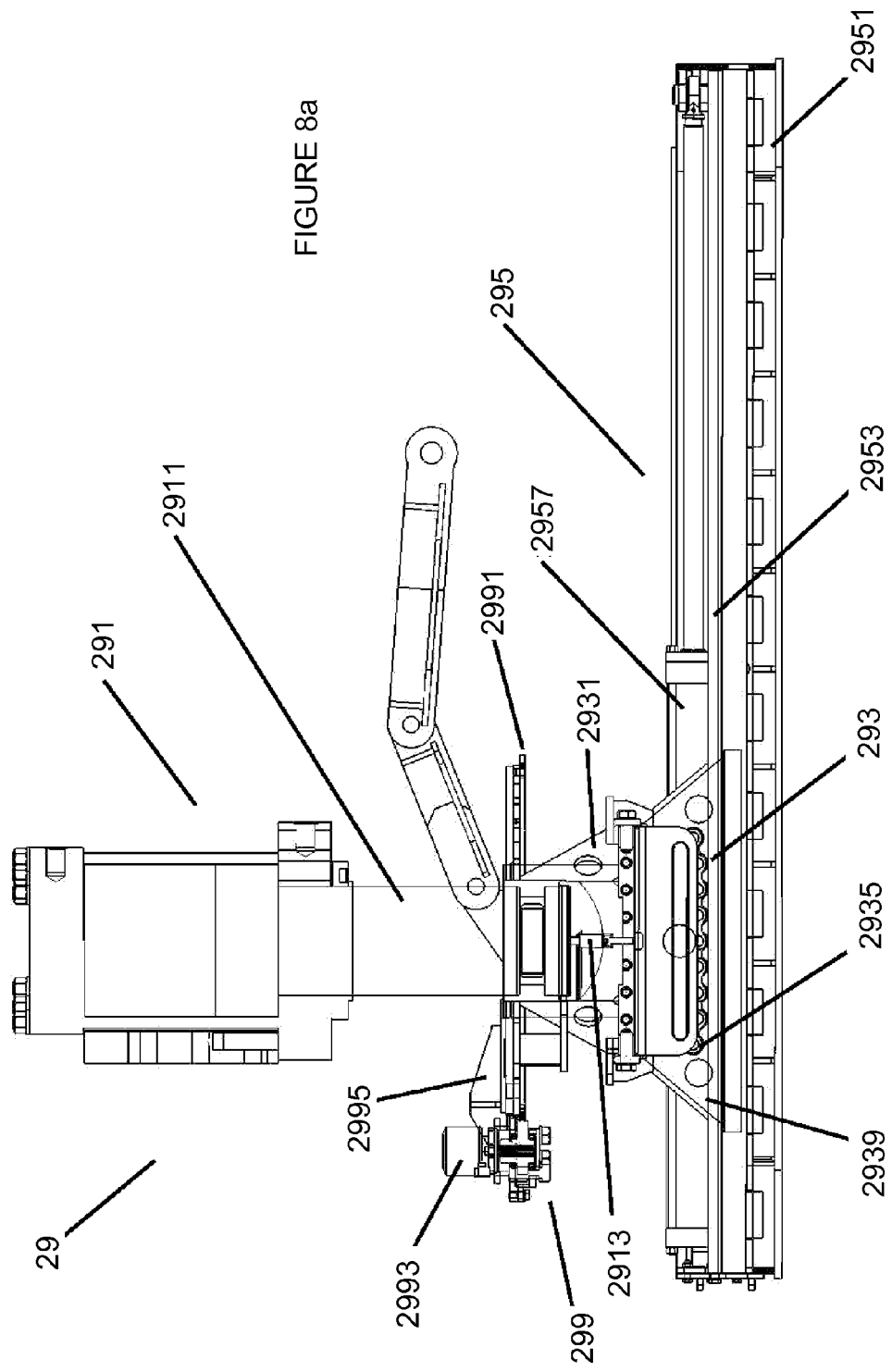
FIG. 8a is a cross sectional view of an articulating pad assembly depicting main frame assembly, pad assembly, and steering assembly.

In yet another embodiment of the heavy machinery substructure 01, a steering assembly 299 is mounted between the main frame weldment 27 and the articulating pad assembly 29. See FIG. 8. Specifically, a spheric bearing 2913 is mounted between the lifting linear actuator 2911 and the pad assembly 293; a gear 2991 is mounted to the pad assembly 295; and a pinioned rotary actuator 2993 is mounted to the main frame weldment 27. The pinioned rotary actuator 2993 is enmeshed with the gear 2991 thereby allowing the articulating pad assembly to rotate about an axis parallel to the lifting linear actuator 2911. See FIGS. 7, 8 and 8a. The pinioned rotary actuator 2993 can be an electro-mechanical rotary actuator, hydraulic rotary actuator or pneumatic rotary actuator.

Movement of the heavy machinery substructure 01 and the heavy machinery 10 is achieved by selectively applying power from a power means 40 to the linear actuators 239, lifting linear actuators 2911 and traversing linear actuators 2957 to cause alternatively lifting the feet 234 and the pads 2951 from the ground and moving the pads 2951 and feet 234 relative to one another. More specifically, the incremental movement of the heavy machinery 10 over ground obstructions includes; placing of each foot 234 on the ground; adjusting the length of each telescopic leg 23 by moving the linear actuators 239 to achieve the user defined clearance above ground obstacles; placing each pad 2951 on the ground and lifting the feet 234 by extending the lifting linear actuators 2911; moving the traversing linear actuators 2957 to roll the heavy machinery 10 substructure across a portion of the tracks 2953; and lowering the lifting linear actuators 2911 to place each foot 234 on the ground and lifting the pads 2951 off the ground. Repetition of these steps results in incremental movement of the heavy machinery 10 over ground obstructions. Once the heavy machinery 10 is in the desired location, the feet 234 are placed on the ground and the articulating pad assemblies can be lifted or placed on the ground.

Figure 9:
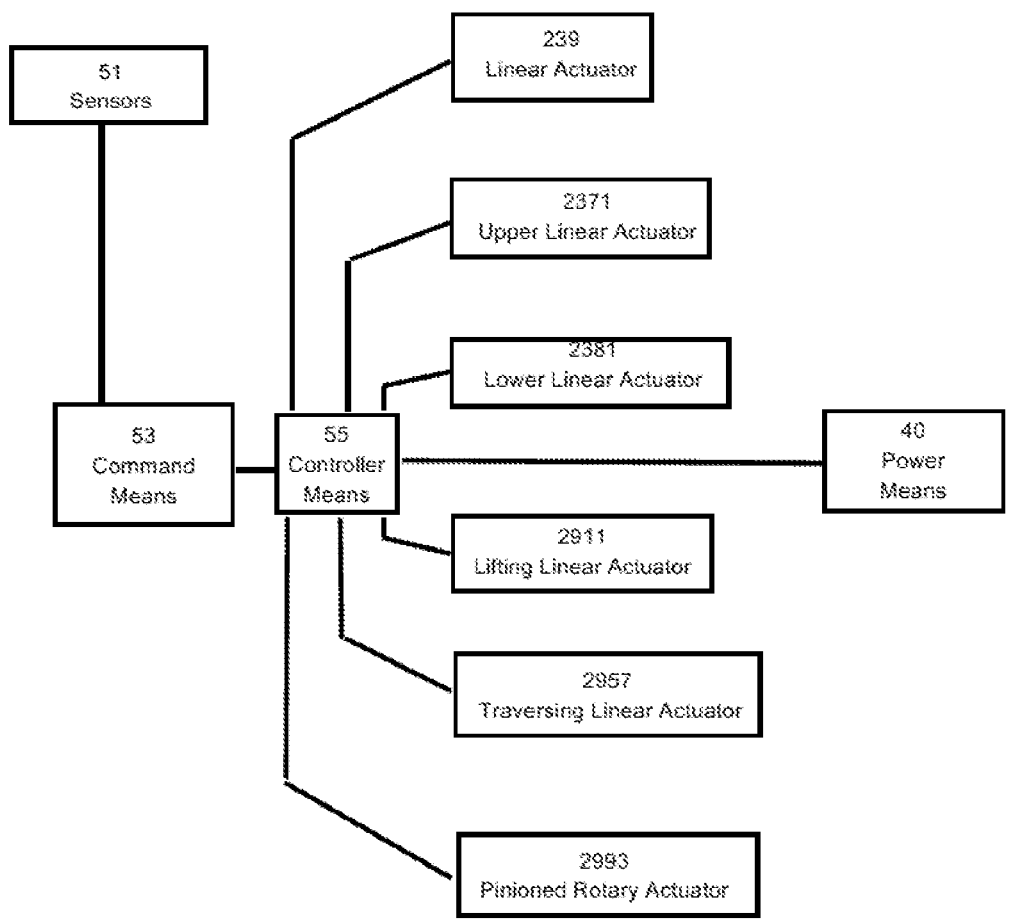
FIG. 9 is an block diagram of an embodiment of a control and power means.

In a preferred embodiment in which pinning assemblies 237, 238 are installed, locking of the telescopic joints 24 can be achieved by selectively applying power from the power means 40 to the upper and lower linear actuators 2371, 2381. In another embodiment, in which steering assemblies 299 are installed, rotation of the pad assemblies 295 can be achieved by selectively applying power from the power means 40 to the pinioned rotary actuator 2993. It is contemplated that power means 40 is a generator capable of producing energy in the form of hydraulic, electro-hydraulic, electric, pneumatic, electro-pneumatic, pneumatic or a combination thereof. In a preferred embodiment, the actuators described herein are hydraulic and the power means 40 is a hydraulic pump fluidly connected to each actuator described herein. In yet another preferred embodiment, a control means 50 is connected to the power means 40 and the actuators described herein to coordinate activation and deactivation of the actuators described herein as well as the power means 40 to achieve and maintain the desired movement and clearance of the heavy machinery substructure 01 and heavy machinery 10 above ground obstructions. See FIG. 9. In one embodiment, the control means 50 includes a sensing system 51 and a command system 53 to coordinate power distribution from the power means 40. The sensing system 51 includes a network of sensors configured to perceive the attitude of the heavy machinery substructure 10 above the ground or ground obstructions as well as the spatial relationship between the components of the incremental stepper assembly 20. See FIG. 9. Sensory information from the sensing system 51 is delivered and processed by the command system 53 and instructional signals are generated and distributed to controllers 55 connected to the power means 40 and each actuator described herein to achieve the desired attitude of the heavy machinery substructure 10 above the ground or ground obstructions and/or spatial relationship between the components of the incremental stepper assembly 20. See FIG. 9.

In a preferred embodiment, removable connections are used to allow the mid-section weldment 30, bridge weldments 21, telescoping legs 23, brace 25, main frame weldment 27, and articulating pad assemblies 29 to be easily disconnected and shipped, transported or stored. It is further contemplated that each of these components may be sized such that their outer dimensions do not exceed the weight, length, width and height restrictions imposed by governmental entities for highway, rail, air or water transportation. In a preferred embodiment, these components are sized such that their outer dimension do not exceed about 15 short tons, a length of about 53 feet, a width of about 8 feet 6 inches and a height of 9 feet 10 inches.

What is claimed is:

1. An heavy machinery substructure for traversing and working over obstructions projecting away from the ground comprising:
    a pair of incremental stepper assemblies configured to support heavy machinery, each incremental stepper assembly comprising:
        a bridge weldment;
        two telescoping legs releasably connected to the bridge weldment at opposing end regions of the bridge weldment, wherein the telescopic legs are configured to position the bridge weldment at a user defined distance above the obstructions, each telescopic leg comprising:
            at least one telescopic joint;
            a foot connected to the lower region of the telescoping leg to make contact with the ground;
            a linear actuator mounted between an upper region of the telescopic leg and a lower region of the telescopic leg such that altering the length of the linear actuator alters the height of the bridge weldment above a ground obstruction;
        two articulating pad assemblies, each articulating pad assembly connected to a corresponding telescoping leg, each articulating pad assembly comprising:
            a pad;
            a lifting linear actuator with two ends, the first end of the lifting linear actuator connected to the telescopic leg and the second end of the lifting linear actuator slideably coupled to the pad to alternatively lift the foot and the pad from the ground; and
            a traversing linear actuator mounted between a lower region of the lifting linear actuator and the pad such that altering the length of the traversing linear actuator moves the pad and foot relative to one another causing stepped movement of the heavy machinery substructure;
    a mid-section weldment releasably connected between the incremental stepper assemblies, the mid-section weldment configured to support the heavy machinery;
    a clearance space formed between the ground and the bridge weldments and the mid-section weldment so that ground obstructions may pass or remain under the bridge weldments, the mid-section or a combination thereof unimpeded by the heavy machinery substructure; and
    a power source to selectively operate the linear actuators, the lifting linear actuator and the transversing linear actuator.

2. A heavy machinery substructure as recited in claim 1, each telescoping leg further comprising a ratchet system connected to the telescoping leg, wherein the ratchet system comprises a pawl fixed on one side of the at least one telescopic joint and selectively engaging a linear rack of teeth fixed on an opposite side of the at least one telescopic joint to prevent the telescoping leg from collapsing upon itself in the event of linear actuator failure or power source failure.

3. A heavy machinery substructure as recited in claim 1, each telescoping leg further comprising a pinning assembly connected to the telescoping leg, wherein the pinning assembly comprises at least one locking pin passing through at least one pair of axially aligned apertures formed through the at least one telescopic joint to fix the length of the telescoping leg to a pre-determined length; and the power source to further selectively operate the pinning assembly.

4. A heavy machinery substructure as recited in claim 1, the articulating pad assembly further comprising a steering assembly mounted between the telescoping leg and the pad assembly, the steering assembly comprising a spherical bearing for rotation of the pad about an axis passing through the lifting linear actuator; and the power source to further selectively operate the steering assembly.

5. A heavy machinery substructure for traversing and working over obstructions projecting away from the ground comprising:
    a pair of bridge weldments;
    a mid-section weldment connected to and between the bridge weldments, the mid-section configured to support heavy machinery;
    two pairs of telescoping legs, each pair of telescoping legs are connected at opposing ends of a corresponding bridge weldment, each telescoping leg comprising:
        a top leg section;
        a middle leg section; the middle leg section nested within and releasably ratchet coupled to the top leg section;
        a bottom leg section nested within and releasably ratchet coupled to the middle leg section;
        a foot connected to a lower region of the bottom leg section;
        a linear actuator with two ends, the first end of the linear actuator connected to the bottom leg section and the second end of the linear actuator connected to the top leg section;
        an articulating pad assembly connected to the bottom leg section, the articulating pad assembly comprising:
            a main frame assembly; and
            a pad assembly, the pad assembly comprising:
                a pad;
                a cylinder cage weldment slideably coupled to the pad; and a traversing linear actuator with two ends, the first end of the traversing linear actuator connected to the pad and the second end of the traversing linear actuator connected to the cylinder cage weldment; and a lifting linear actuator with two ends, the first end of the lifting linear actuator connected to the main frame assembly and the second end of the lifting linear actuator connected to the pad assembly; and a power means to selectively operate:

the linear actuators to alter the above ground height of the bridge weldment;

the lifting linear actuator and the traversing linear actuator to incrementally move the bridge weldment in a user defined direction through alternating ground contact of the pads and the feet.

6. A heavy machinery substructure as recited in claim 5, each telescoping leg further comprising:

an upper ratchet system connected between top leg section and middle leg section, the upper ratchet system comprising:

an upper linear rack connected to the top leg section, the upper linear rack comprising:

a plurality of asymmetrical teeth fixed and extending away from the upper linear rack;

an upper pawl connected to the middle leg section, the upper pawl configured to selectively engage the plurality of asymmetrical teeth of the upper linear rack to prevent movement of the top leg section towards the middle leg section;

a lower ratchet system connected between the middle leg section and the bottom leg section, the lower ratchet system comprising:

a lower linear rack connected to the bottom leg section, the lower linear rack comprising:

a plurality of asymmetrical teeth fixed and extending away from the lower linear rack; and lower pawl connected to the middle leg section, the lower pawl configured to selectively engage the plurality of asymmetrical teeth of the lower linear rack to prevent movement of the middle leg section towards the lower leg section.

7. A heavy machinery substructure as recited in claim 5, each telescopic leg further comprising:

an upper locking aperture formed in the top leg section;

at least two middle locking apertures formed in the middle leg section, the first middle locking aperture located above the second middle locking aperture;

a lower locking aperture formed in the bottom leg section;

an upper pinning assembly mounted on the middle leg section, the upper pinning assembly comprising:

an upper locking pin of sufficient length to pass through the upper locking aperture and the first middle locking aperture when the upper locking aperture and the first middle locking aperture are aligned; and an upper linear actuator mounted to the middle leg section and connected to one end of the upper locking pin, the upper linear actuator configured to stroke the upper locking pin in or out of the aligned upper locking aperture and the first middle locking aperture;

a lower pinning assembly mounted on the bottom leg section, the lower pinning assembly comprising:

a lower locking pin of sufficient length to pass through the lower locking aperture and the second middle locking aperture when the lower locking aperture and the second middle locking aperture are aligned; and a lower linear actuator mounted to the bottom leg section and connected to one end of the lower locking pin, the lower linear actuator configured to stoke the lower locking pin in or out of the aligned lower locking aperture and the second middle locking aperture; and the power means to further selectively operate the upper linear actuator and the lower linear actuator.

8. A heavy machinery substructure as recited in claim 5, wherein each articulating pad assembly further comprising:

a steering assembly mounted to the main frame weldment and the articulating pad assembly, the steering assembly comprising:

a spheric bearing mounted between the lifting linear actuator and the pad assembly;

a gear mounted to the pad assembly;

a pinioned rotary actuator mounted to the main frame weldment and further enmeshed with the gear;

the power means to further selectively operate the pinioned rotary actuator to rotate the pad assembly to a user defined position.

9. A heavy machinery substructure for traversing and working over obstructions projecting away from the ground comprising:

a pair of bridge weldments;

a mid-section weldment connected to and between the bridge weldments, the mid-section configured to support heavy machinery;

two pairs of telescoping legs, each pair of telescoping legs are connected at opposing ends of a corresponding bridge weldment, each telescoping leg comprising:

a top leg section;

a middle leg section; the middle leg section nested within and releasably ratchet coupled to the top leg section;

a bottom leg section nested within and releasably ratchet coupled to the middle leg section;

a foot connected to a lower region of the bottom leg section;

a linear actuator with two ends, the first end of the linear actuator connected to the bottom leg section and the second end of the linear actuator connected to the top leg section;

an articulating pad assembly connected to the bottom leg section, the articulating pad assembly comprising:

a main frame assembly; and a pad assembly, the pad assembly comprising:

a pad;

a cylinder cage weldment slideably coupled to the pad; and a traversing linear actuator with two ends, the first end of the traversing linear actuator connected to the pad and the second end of the traversing linear actuator connected to the cylinder cage weldment; and a lifting linear actuator with two ends, the first end of the lifting linear actuator connected to the main frame assembly and the second end of the lifting linear actuator connected to the pad assembly; and a power means to selectively operate:

the linear actuators to alter the above ground height of the bridge weldment;

the lifting linear actuator and the traversing linear actuator to incrementally move the bridge weldment in a user defined direction through alternating ground contact of the pads and the feet; and wherein outer dimensions of the telescoping legs and outer dimension of the bridge weldment, separately do not exceed a length of about 53 feet, a width of about 8 feet 6 inches and a height of 9 feet 10 inches.

* * * * *